United States Patent [19]

Ikezawa et al.

[11] Patent Number: 5,759,929
[45] Date of Patent: Jun. 2, 1998

[54] BIO-DEGRADABLE COMPOSITE NONWOVEN FABRIC FOR PLANT CULTIVATION

[75] Inventors: Hideo Ikezawa, Tokyo; Masaru Kadota, Ichikawa; Tomotsugu Miyoshi, Kawagoe, all of Japan

[73] Assignee: New Oji Paper Co., Ltd., Tokyo, Japan

[21] Appl. No.: 623,380

[22] Filed: Mar. 28, 1996

[30] Foreign Application Priority Data

Mar. 31, 1995 [JP] Japan ................................. 7-097620

[51] Int. Cl.$^6$ ........................... A01G 13/00; B32B 3/06; B32B 5/06
[52] U.S. Cl. .................. 442/385; 28/104; 111/199; 111/200; 442/387; 442/412; 442/414; 428/340
[58] Field of Search ....................... 28/104; 111/199, 111/200; 442/385, 387, 412, 414; 428/340

[56] References Cited

U.S. PATENT DOCUMENTS

| | | | |
|---|---|---|---|
| 4,808,467 | 2/1989 | Suskind et al. | 28/104 |
| 5,026,587 | 6/1991 | Austin et al. | 428/91 |

FOREIGN PATENT DOCUMENTS

| | | |
|---|---|---|
| 51-39246 | 4/1976 | Japan . |
| 6-225628 | 8/1994 | Japan . |
| 6-233632 | 8/1994 | Japan . |

OTHER PUBLICATIONS

*Chemical Abstracts*: 125 (14) 170169d.

*Primary Examiner*—James C. Cannon
*Attorney, Agent, or Firm*—Armstrong, Westerman, Hattori, McLeland & Naughton

[57] ABSTRACT

A bio-degradable composite nonwoven fabric for plant cultivation includes a wood pulp paper sheet laminated on a bio-degradable aliphatic polyester filament nonwoven fabric, wherein the polyester filaments and the pulp fibers are entangled to each other and a plurality of spot regions which are spaced from each other, are substantially free from the pulp fibers and have a decreased distribution density of the polyester filaments of 30 to 50%, an area of 0.16 to 16 mm$^2$ and a total area coresponding to 5 to 60% of the total surface area of the composite nonwoven fabric, are formed. The polyester filament distribution density is defined as the ratio of the total area of the polyester filaments appearing within the spot regions to the total surface area of the spot regions, determined from photographs of the spot regions.

29 Claims, 3 Drawing Sheets

BIO-DEGRADABLE COMPOSITE NONWOVEN FABRIC FOR PLANT CULTIVATION

BACKGROUND OF THE INVENTION

The present invention relates to a bio-degradable composite nonwoven fabric for a plant cultivation sheet and a process for producing same. More particularly, the present invention relates to a composite nonwoven fabric which is degradable microbiologically and is usable as a plant cultivation sheet, and a process for producing same. Still more particularly, the present invention relates to a bio-degradable composite nonwoven fabric usable for a plant cultivation sheet, and capable of preventing washing and blowing away of seeds of plants and soil by rain and wind, until the seeds germinate and take roots in the ground, and thereafter of allowing the shoots of the plants to grow through the plant cultivation sheet, and having a satisfactory mechanical strength both in wet and dry conditions. When the plant cultivation sheet is placed on an embankment or dike, the sheet can prevent the washing away of the seeds and soil into water.

DESCRIPTION OF THE RELATED ART

Generally, a nonwoven fabric is manufactured by accumulating a plurality of loose continuous filaments comprising a thermoplastic polymer material, for example, polyethylene terephthalate or a polypropylene, on a support into a web form, and locally bonding the filaments to each other, in regions regularly separated from each other, at intersecting points of the filaments. The local bonding of the filaments can be effected by locally pressing the web at a temperature equal to or higher than the softening temperature, optionally the melting temperature, of the filaments. This type of nonwoven fabric is commonly referred to as a spun-bonded woven fabric. This type of nonwoven fabric has not only a higher producibility than that of other nonwoven fabrics, but also high mechanical strength and flexibility and thus is widely used as a mulching sheet for agriculture and for other uses. When the nonwoven fabric is used for agricultural use, the fabric is required to have not only sufficient air permeability and moisture permeability but also satisfactory light-shielding properties and weed-preventing properties. Therefore, the conventional agricultural nonwoven fabric has a relatively large basis weight and thickness and optionally a light-shielding paint, for example, a black-colored paint, is applied to the nonwoven fabric.

The above-mentioned type of conventional agricultural sheet necessarily obstructs the germination of plants, and the shoots cannot grow through the conventional sheets. Accordingly, when conventional agricultural sheets are utilized as plant cultivation sheets, it is necessary to form a plurality of throughholes in the sheets by a secondary processing. This secondary processing results in undesirably increased time, labor and cost. Also, the secondary processing may cause the resultant processed sheet to exhibit a decreased mechanical strength.

Further, the conventional spun-bonded nonwoven fabrics exhibit unsatisfactory water-retaining property and water-absorbent property and thus are generally unsuitable as plant-cultivation sheets. Still further, the conventional spun-bonded nonwoven fabrics have no-bio-degradation property and thus, after use, the used nonwoven fabrics must be treated as a garbage.

When a spun-bonded nonwoven fabric has a coarse structure and a low basis weight and is used as a plant cultivation sheet to allow the shoots to grow through the sheet, the coarse structure of the nonwoven fabric includes portions having an extremely low distribution density of the filaments, and thus allows the seeds or soil to be washed away or blown away by rain or wind through the low density portion of the sheet. Also, the coarse sheets have a low mechanical strength and thus are easily broken. Further, the coarse sheets exhibit poor water-retaining properties and water-absorbent properties.

It is possible to use, as a plant cultivation sheet, a coarse woven fabric having a plurality of regular throughholes (openings). The coarse weave structure of the woven fabric is, however, disadvantageous in that slippage of warps and wefts easily occurs, the sheet is easily deformed, the width of fabric easily decreases and thus handling of the sheet is very difficult. Also, when the sheet is greatly deformed, the deformed sheet may not have the desired throughholes. To solve the above-mentioned disadvantages, if the coarse woven fabric is made from thick yarns, and thus has a high basis weight, the production cost of the woven fabric significantly increases.

There have been attempts to use a bio-degradable nonwoven fabric as a plant cultivation sheet. For example, Japanese Examined Patent Publication (Kokoku) No. 53-33488 discloses a plant cultivation sheet comprising a bio-degradable rayon continuous filament nonwoven fabric. This rayon sheet is disadvantageous in a low mechanical strength and elongation when wetted with water.

Japanese Unexamined Patent Publication (Kokai) No. 6-233,632 discloses a plant cultivation sheet comprising a nonwoven fabric made from bio-degradable staple fibers having a fiber length of 30 to 60 mm and provided with a plurality of throughholes. In the production of the nonwoven fabric, the staple fibers are accumulated into a web form and entangled with each other by needle-punching the web or directing water jet streams toward the web. This type of staple fiber nonwoven fabric is disadvantageous in that since no staple fibers are distributed in the throughholes, the seeds or soil are easily washed away through the throughholes. Also, the staple fiber nonwoven fabric exhibits a poor processability and a workability, and when wetted with water, significantly decreased mechanical strength. Accordingly, conventional staple fiber nonwoven fabric is still unsatisfactory as a plant cultivation sheet.

Further Japanese Unexamined Patent Publication No. 6-225,628 discloses a plant cultivation sheet produced by forming a web from bio-degradable fibers, needle-punching the web to form a nonwoven fabric from the web and forming a plurality of throughholes in the nonwoven fabric by mechanical means. This type of conventional plant cultivation sheet is disadvantageous in that the nonwoven fabric has too large a basis weight and exhibits unsatisfactory handling properties and processability. Also, the mechanical throughhole-forming step causes an increased cost, time and labor for the production of the sheet. Further, the throughhole-having sheet is not suitable for the use in which the sheet is formed into bags and seeds mixed in soil are contained in the bags, and the bags are placed on, for example, an embankment or a dike.

SUMMARY OF THE INVENTION

An object of the present invention is to provide a bio-degradable composite nonwoven fabric, usable for a plant cultivation sheet, which has excellent mechanical strength under both wet and dry conditions, and satisfactory flexibility and processability, and, when the nonwoven fabric is used as a plant cultivation sheet, which can cover the soil sown with seeds and is capable of preventing washing away or blowing away of the seeds and/or soil and allowing germination and growth of the seeds and growth of roots through the sheet, and a process for producing same.

The above-mentioned object can be attained by the bio-degradable composite nonwoven fabric of the present invention for a plant cultivation sheet, and the process for producing the same.

The bio-degradable composite nonwoven fabric of the present invention for a plant cultivation sheet comprises:

(A) a bio-degradable polyester filament nonwoven fabric layer consisting of a plurality of continuous filaments comprising a bio-degradable polyester which is a polymerization product of at least one aliphatic dihydric alcohol with at least one member selected from the group consisting of aliphatic dicarboxylic acids and derivatives thereof; and (B) a paper sheet layer laminated on the biodegradable polyester filament nonwoven fabric layer and comprising wood pulp fibers, wherein (a) the continuous filaments and the wood pulp fibers are three-dimensionally entangled with each other to form a composite nonwoven fabric, and (b) a plurality of spot regions which are spaced from each other, are substantially free from the pulp fibers, and have a distribution density of the continuous filaments of 30 to 50%, an area of 0.16 to 16 mm$^2$, and a total area corresponding to 5 to 60% of the total surface area of the composite nonwoven fabric, are provided in the composite nonwoven fabric, the distribution density of the continuous filaments being defined as a ratio of a total area of the continuous filaments visible within a pulp fiber-free spot region to the surface area of the pulp fiber-free spot region, determined from a photograph of the spot region.

The process of the present invention for producing the bio-degradable composite nonwoven fabric as mentioned above, comprises the steps of:

(1) forming a laminate comprising (A) a bio-degradable polyester filament nonwoven fabric consisting of a plurality of continuous filaments comprising a bio-degradable aliphatic polyester which is a polymerization product of at least one aliphatic dihydric alcohol with at least one member selected from the group consisting of aliphatic dicarboxylic acids and derivatives thereof, and superimposed on a support having a plurality of supporting protuberances regularly spaced from each other, (B) a paper sheet comprising wood pulp fibers superimposed on the bio-degradable polyester filament nonwoven fabric; and (2) directing a plurality of water jet streams through nozzle openings toward the paper sheet surface of the laminate at a pressure sufficient to locally press the laminate against the supporting protuberances which do not allow the water jet streams to permeate therethrough, to penetrate the laminate and thereby to three-dimensionally entangle the pulp fibers and the bio-degradable polyester filaments in the laminate with each other so as to convert the laminate to a composite nonwoven fabric, wherein the pressure applied to the water jet streams is also sufficient to force the pulp fibers in portions of the pressed laminate located on and around the supporting protuberances to move to the circumferences of the pressed laminate portions, and the bio-degradable polyester filaments in the pressed laminate portions to move toward the circumferences of the pressed laminate portions, whereby, a plurality of spot regions, which are spaced from each other, are substantially free from the pulp fibers, and have a distribution density of the bio-degradable polyester filaments of 30 to 50%, an area of 0.16 to 16 mm$^2$ and a total area corresponding to 5 to 60% of the total surface area of the composite nonwoven fabric, are regularly formed in the resultant composite nonwoven fabric, the distribution density of the polyester filaments being defined as a ratio of the total area of the polyester filaments visible within a pulp fiber-free spot region to the surface area of the spot region, determined from a photograph of the spot region.

DESCRIPTION OF THE PREFERRED EMBODIMENTS

Figure 1:
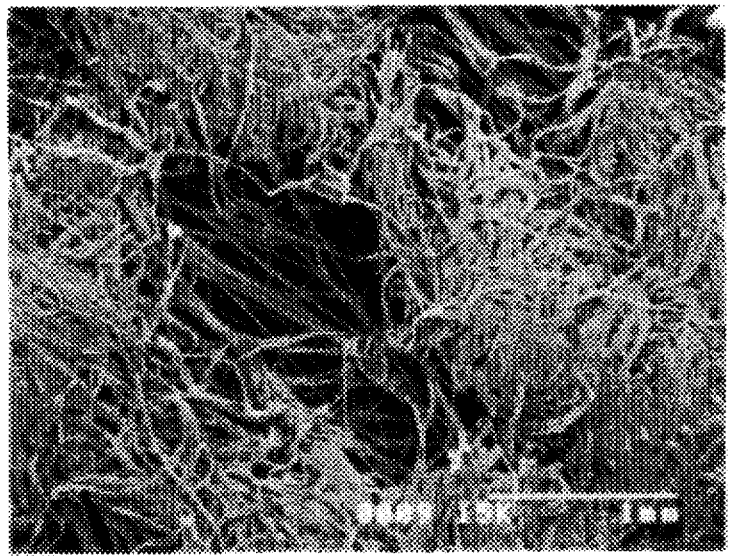
FIG. 1 is a photograph of an embodiment of a bio-degradable composite nonwoven fabric of the present invention with a pulp fiber-free spot region appearing in the center portion of the photograph.

The inventors of the present invention have made an extensive effort to provide a bio-degradable plant cultivation sheet and found that a composite nonwoven fabric made from a laminate of a paper sheet on a nonwoven fabric comprising bio-degradable continuous aliphatic polyester filaments by applying water jet streams to the laminate to such an extent that the pulp fibers in the paper sheet and the continuous filaments in the nonwoven fabric are three-dimensionally entangled with each other to form a composite nonwoven fabric and a plurality of specific regions spaced from each other are formed in the composite nonwoven fabric, which specific region is substantially free from the pulp fibers and in which region the continuous filaments are distributed in a decreased distribution density, allows seeds to germinate and grow through the specific regions of the composite nonwoven fabric. The present invention has been completed based on the above-mentioned finding.

The bio-degradable composite nonwoven fabric of the present invention is useful for plant cultivation and comprises (A) a bio-degradable polyester filament nonwoven fabric layer consisting essentially of a plurality of continuous filaments comprising a bio-degradable polyester and (B) a paper sheet layer laminated on the bio-degradable polyester filament nonwoven fabric layer (A) and comprising wood pulp fibers.

The bio-degradable polyester is a polymerization product of a glycol component consisting of at least one aliphatic dihydric alcohol with a dicarboxylic acid component consisting of at least one member selected from the group consisting of aliphatic dicarboxylic acids and hydroxyl and acetoxyl derivatives of the above-mentioned dicarboxylic acids.

In the bio-degradable composite nonwoven fabric of the present invention, (a) the continuous filaments and the wood pulp fibers are three-dimensionally entangled with each other to form a composite nonwoven fabric, and the composite nonwoven fabric has a plurality of spot regions which are spaced from each other, are substantially free from each other, and have a decreased distribution density of the continuous filaments.

The bio-degradable aliphatic polyester is produced by polymerizing a glycol component comprising at least one aliphatic dihydric alcohol with a dicarboxylic acid component comprising at least one member selected from aliphatic dicarboxylic acids and hydroxyl and acetoxyl derivatives of the above-mentioned dicarboxylic acids.

The aliphatic dihydric alcohol is preferably selected from the group consisting of alkylene glycols having 2 to 12 carbon atoms and cycloalkylene glycols and cycloalkylene-dialkanols having 5 to 12 carbon atoms, for example, ethylene glycol, butane diol, hexane diol, decamethylene glycol, neopentyl glycol, cyclohexane dimethanol. Also, ethylene oxide can be utilized for the production of the aliphatic polyester.

The aliphatic dihydric alcohol may be used alone or in a mixture of two or more thereof. Also, the aliphatic dihydric alcohol may be used together with a small amount of additional hydroxyl compound, for example, trifunctional or tetrafunctional polyhydric alcohols and hydroxycarboxylic acids; and polybasic carboxylic acids, for example, glycerol, erythritol, glycolic acid, lactic acid and tricarballylic acid.

The aliphatic dicarboxylic acid for the bio-degradable aliphatic polyester is preferably selected from the group consisting of malonic acid succinic acid, adipic acid, suberic acid, sebacic acid and dodecanoic diacid. The hydroxyl and acetoxyl derivatives of the aliphatic dicarboxylic acids preferably selected from tartaric acid (dihydroxysuccinic acid), malic acid (hydroxysuccinic acid) tetrahydroxysuccinic acid, tartronic acid (hydroxymalonic acid) and acetoxysuccinic acid.

Among the above-mentioned aliphatic dicarboxylic acids and derivatives thereof, in view of bio-degradability and producibility, the succinic acid and hydroxyl and acetoxyl derivatives of the succinic acid are most preferable for the present invention.

The dicarboxylic acid component optionally contains a small amount of an aliphatic tri- or more carboxylic acid or a hydroxy-tri or more carboxylic acid, for example, citric acid tricarballylic acid and camphoronic acid.

The aliphatic polyester filaments are produced by heat-melting an aliphatic polyester, extruding the aliphatic polyester melt through a plurality of filament-forming orifices, and drawing the extruded polyester filaments by using a high-speed, high-pressure air blast ejected from an ejector. The aliphatic polyester resin usable for the present invention preferably has a melt flow rate of 15 to 70 g/10 minutes, more preferably 20 to 60 g/10 minutes, determined under a load of 2.16 kgf at a temperature of 190° C., in accordance with Japanese Industrial Standard (JIS) K 7210. If the melt flow rate is less than 15 g/10 minutes, the temperature necessary to carry out the melt-spinning procedures may become too high, and thus the production cost of the aliphatic polyester filaments may be too high, and the resultant nonwoven fabric may exhibit too high a stiffness and an unsatisfactory hand feeling. Also, if the melt flow rate is more than 70 g/10 minutes, the resultant melt-extruded filaments may be easily broken during the drawing procedure by the high pressure air blast.

In the melt-spinning procedures, the aliphatic polyester is melted preferably at a temperature of 50° to 135° C., more preferably 50° to 120° C., above the melting temperature of the aliphatic polyester. If the melt-spinning temperature is lower than the temperature of 50° C. above the melting temperature of the aliphatic polyester, the resultant aliphatic polyester melt may exhibit too low a viscosity which is insufficient to smoothly effect the melt-spinning procedure. If the melt-spinning temperature is higher than the temperature of 135° C. above the melting temperature of the aliphatic polyester, the difference between the melt-spinning temperature and the melting temperature is too large, and thus when the aliphatic polyester melt is extruded through a plurality of spinning orifices, it may be difficult to evenly cool the extruded filamentary melt streams, mutual adhesion and breakage of the filamentary melt streams easily occur, and the aliphatic polymer melt may exhibit a reduced chemical stability and may partially decompose.

The aliphatic polyester resin to be melt-spun preferably has a moisture content of 0.2% by weight or less, more preferably 0.05% by weight or less. If the moisture content is more than 0.2% by weight, the extruded filamentary melt streams may be easily broken, and in an extreme case, the polyester resin is decomposed to such an extent that the polyester resin melt cannot be melt-spun.

In the formation of a spun-bonded filament nonwoven fabric, a plurality of the aliphatic polyester undrawn filaments produced by extruding the aliphatic polyester melt through a plurality of melt-spinning orifices, are drawn by the high pressure air blast ejected from the ejector; the drawn filaments are blown against a bump plate to generate electric charge on the filaments and to open the filaments; and the opened filaments are accumulated on a support to form a nonwoven web in which the accumulated filaments randomly intersect with each other. The electric charge may be generated by applying a corona discharge treatment to the drawn filaments to loose (open) the filaments. The drawn filaments preferably has a thickness of 1 to 10 deniers. If the thickness is less than 1 denier, the production of the fine filament with a satisfactory stability in operational conditions may be difficult. Also, if the thickness is more than 10 deniers, the resultant filament nonwoven fabric may have too high a stiffness and thus the resultant composite nonwoven fabric may exhibit an unsatisfactory hand feeling.

In the composite nonwoven fabric of the present invention, the bio-degradable polyester filament nonwoven fabric optionally has a plurality of filament-bonded portions in which the filaments are locally press-bonded to each other, at the intersecting points thereof, to dimensionally stabilize the nonwoven fabric. The plurality of filament-bonded portions of the bio-degradable polyester filament nonwoven fabric may be distributed regularly or at random, preferably regularly, in other words at uniform intervals in the longitudinal and transverse directions of the bio-degradable polyester filament nonwoven fabric. The filament-bonded portions can be formed by introducing a filament web formed by accumulating a plurality of the bio-degradable polyester filaments on a substrate to a embossing machine consisting of an embossing roll, and a smooth roll to locally heat-press the web under a pressure, in accordance with the embossing pattern of the embossing roll and to locally press bond the filaments to each other at the intersecting points thereof. In the filament bonding procedures, the pressing temperature is preferably 5° to 50° C., more preferably 5° to 40° C., below the melting temperature of the filaments. If the difference between the pressing temperature and the melting temperature of the filaments is less than 5° C., portions of the filaments may fuse-adheres to the embossing roller surface or the smooth roller surface so as to cause a difficulty of the local heat-pressing procedures. Also, if the temperature difference is more than 50° C., the bonding of the filaments to each other is effected unsatisfactory and the resultant nonwoven fabric has a significantly insufficient mechanical strength and is undesirably fluffed.

When the filament-bonded portions are formed by the embossing machine, preferably a linear pressure of 10 to 80 kg/cm, more preferably 20 to 60 kg/cm is applied. If the pressure is less than 10 kg/cm, the filament-bonded portions may be not satisfactorily formed. Also, if the pressure is more than 80 kg/cm, the resultant heat-pressed nonwoven fabric may exhibit an undesirable plastic film-like hand feeling.

In another method of forming the filament-bonded portions, the filament web prepared by the above-mentioned procedures is introduced between an embossing roll and an ultrasonic applicator to apply a local ultrasonic treatment to the web, in accordance with the embossing pattern.

In the present invention, the individual filament-bonded portion of the bio-degradable polyester filament nonwoven fabric preferably has an area of 0.03 to 4 $mm^2$, more preferably 0.03 to 2.5 $mm^2$. If the filament-bonded portion area is less than 0.03 $mm^2$, in the resultant polyester filament nonwoven fabric, the mechanical strength enhancing effect of the filament-bonded portions may be unsatisfactory. Also, if the filament-bonded portion area is more than 4 $mm^2$, the resultant polyester filament nonwoven fabric may exhibit an undesirably high stiffness.

The total area of the filament-bonded portions preferably corresponds to 2 to 20%, more preferably 3 to 15%, of the total area of the polyester filament nonwoven fabric. If the total area is less than 2%, the mechanical strength-enhancing effect of the filament-bonded portions may be unsatisfactory. Also, if the total area is more than 20%, the resultant polyester filament nonwoven fabric may exhibit too high a stiffness.

The bio-degradable polyester filament nonwoven fabric usable for the present invention preferably has a basis weight of 5 to 30 $g/m^2$, more preferably 8 to 25 $g/m^2$. If the basis weight is less than 5 $g/m^2$, it may be difficult to stably or smoothly produce the polyester filament nonwoven fabric and the resultant nonwoven fabric has an unsatisfactory mechanical strength. Also, if the basis weight is more than 30 $g/m^2$, the resultant spot regions formed in the composite nonwoven fabric have an unsatisfactorily high distribution density of the polyester filaments, and thus undesirably obstructs germination of plant seeds and growth of the plant, through the composite nonwoven fabric.

Also, the bio-degradable polyester filament nonwoven fabric usable for the present invention preferably has a density of 0.10 to 0.15 $g/cm^3$. This density can be calculated from the basis weight of the nonwoven fabric and the thickness of the nonwoven fabric under a load of 2 kPa.

The paper sheet laminated on the bio-degradable polyester filament nonwoven fabric serves to advantageously cover the polyester filament nonwoven fabric to provide a composite nonwoven fabric having a uniform thickness and appearance, except for the spot regions thereof, even when the polyester filament nonwoven fabric is uneven in filament distribution. This feature of the composite nonwoven fabric of the present invention is important to prevent washing and blowing away of plant seed and soil covered by the composite nonwoven fabric. Also, the paper sheet advantageously imparts appropriate water-holding and absorbing properties to the composite nonwoven fabric.

The paper sheet usable for the present invention can be produced by a wet paper-making method using an aqueous wood pulp slurry and drying the resultant wet paper sheet. The wood pulp usable for the present invention is not limited to specific sort of wood pulps, and include chemical pulps produced from soft woods or hard woods by a kraft pulping method, soda pulping method, or polysulfide pulping method and mechanical pulps produced from soft or hard woods by a grinding method or thermomechanical pulping method. The pulp may be a bleached one, or an unbleached one, or mixture thereof.

The dried paper sheet usable for the composite nonwoven fabric of the present invention is not limited to those having a specific basis weight. Nevertheless, the basis weight of the paper sheet is preferably 10 to 150 $g/m^2$, more preferably 20 to 120 $g/m^2$, determined in accordance with JIS P 8124. If the basis weight of the paper sheet is less than 10 $g/m^2$, the resultant composite nonwoven fabric may exhibit an unsatisfactory water-retaining property and handling property, and may not satisfactorily prevent the washing and blowing away of the plant seeds and soil covered by the nonwoven fabric. Also, if the basis weight of the paper sheet is more than 150 $g/m^2$, the individual pulp fibers are difficult to satisfactorily separate from each other by the application of the water jet streams under high pressure against the paper sheet layer surface of the composite nonwoven fabric, and thus the formation of the spot region substantially free from the pulp fibers may be difficult.

The paper sheet usable for the present invention preferably has a density of 0.65 $g/cm^3$ or less, more preferably 0.2 to 0.65 $g/cm^3$, determined in accordance with JIS P 8118. If the density is more than 0.65 $g/cm^3$, the movement of the individual pulp fibers when the high pressure water jet streams are directed toward the paper sheet layer surface, may be restricted and thus the entanglement of the pulp fibers with the continuous filaments may be difficult.

Preferably, the paper sheet usable for the present invention has a wet tensile strength of 0.04 to 1.5 kgf, more preferably 0.04 to 1.0 kgf, per 25 mm width, determined in accordance with JIS P 8135, using specimens having a width of 25 mm. If the wet tensile strength is less than 0.04 kgf/25 mm, and when the high pressure water jet streams are spouted against the paper sheet surface, the wetted paper sheet is too easily broken, and thus the continuous production of the composite nonwoven fabric under a stabilized condition may be difficult. If the wet tensile strength is more than 1.5 kgf/25 mm, the individual pulp fibers in the paper sheet may be difficult to separate from each other upon applying the high pressure water jet streams toward the paper sheet, and thus the pulp fibers may not satisfactorily entangle with the continuous filaments.

In the production of the composite nonwoven fabric of the present invention, the paper sheet is employed preferably in a ratio of basis weight to the bio-degradable polyester filament nonwoven fabric of 1:0.05 to 1:2, more preferably 1:0.08 to 1:1. If the basis weight ratio is more than 1:0.05, the proportion of the pulp fibers to the total amount of the composite nonwoven fabric may be too large, and thus when the high pressure water jet streams are directed toward the paper sheet, the formation of the spot regions substantially free from the pulp fibers may be difficult. Also, if the basis weight ratio is less than 1:2, the proportion of the continuous filaments to the composite nonwoven fabric may be too large, and thus the distribution density of the continuous filaments in the resultant spot region may be unsatisfactorily low, and the production cost of the composite nonwoven fabric may be too high, or the proportion of the pulp fibers may be too small, and thus the resultant composite nonwoven fabric may exhibit a low water-retaining property.

In the bio-degradable composite nonwoven fabric of the present invention, the pulp fibers of the paper sheet and the continuous filaments of the polyester filament nonwoven fabric are three-dimensionally entangled with each other to bind the paper sheet layer and the polyester filament nonwoven fabric layer with each other and to form a composite nonwoven fabric. Also, the composite nonwoven fabric is provided with a plurality of spot regions which are spaced from each other and are substantially free from the pulp fibers, and in which the continuous filaments are present in a decreased distribution density.

Referring to FIG. 1, a spot region is located in the center portion of the photograph. The spot region is substantially free from pulp fibers while a plurality of pulp fibers are accumulated in portions surrounding the spot region. Also, in the spot region, the continuous filaments are located in a low distribution density. Namely, a plurality of spaces are formed between the continuous filaments. The spaces enable the plant seeds to germinate and grow therethrough.

The decreased distribution density of the continuous filaments located within the pulp fiber-free spot regions is defined as an average ratio (in %) of total areas of the continuous filaments visible within the spot regions to the areas of the spot regions.

The distribution density of the continuous filaments located within a pulp fiber-free spot region is determined by the following method.

A composite nonwoven fabric provided with a plurality of pulp fiber-free spot region is photographed at a right angle to the paper sheet side surface of the composite nonwoven fabric; an image of a spot region in the photograph is magnified by using a scanning electron microscope; the magnified image of the spot region is analysed by an image anlyser to measure of a total area of images of the continuous filaments appearing in the spot region of the photograph; and a ratio of the total area of the continuous filament images appearing within the spot region image to the area of the spot region image is determined.

The above-mentioned measurements are repeated on 50 pulp fiber-free spot regions of the composite nonwoven fabric and an average of the measurement results is determined.

The distribution density of the continuous filaments located within the pulp fiber-free spot regions is represented by the above-mentioned average ratio of the total area of the continuous filaments located within the pulp fiber-free spot regions to the area of the spot regions.

In the present invention, the pulp fiber-free spot regions of the composite nonwoven fabric have an average distribution density of the continuous filaments located within the pulp fiber-free spot regions of 30 to 50%, preferably 40 to 50%.

Usually, the remaining portions surrounding the spot regions of the composite nonwoven fabric have a distribution density of the continuous polyester filaments of 55 to 70%, preferably 55 to 60%. Accordingly, the pulp fiber-free spot regions have a filament distribution density significantly smaller than that of the remaining portions of the composite nonwoven fabric.

If the continuous filament distribution density of the pulp fibre-free spot regions is more than 50%, the resultant composite nonwoven fabric is disadvantageous in that the pulp fiber-free spot regions may not allow the germination of plant seeds and the growth of the plant through the spot regions.

Also, if the filament distribution density is less than 30%, the resultant composite nonwoven fabric is disadvantageous in that the pulp fiber-free spot regions may allow the plant seeds and soil to be washed or blown away therethrough.

In the bio-degradable composite nonwoven fabric of the present invention, the pulp fiber-free spot regions has an area of 0.16 to 16 $mm^2$, preferably 0.5 to 10 $mm^2$. If the area of the individual pulp fiber-free spot regions of the composite nonwoven fabric is less than 0.16 $mm^2$, the spot regions do not allow the germination of the plant seeds and the growth of the plant through the spot regions. Also, if the individual spot region area is more than 16 $mm^2$, the spot regions allow the seeds or soil to wash or blow away therethrough, and the resultant composite nonwoven fabric exhibits an unsatisfactory mechanical strength and thus may be easily broken.

The pulp fiber-free spot regions of the composite nonwoven fabric of the present invention are present in a total area corresponding to 5 to 60%, preferably 10 to 50%, of the total area of the composite nonwoven fabric.

If the total area of the pulp fiber-free spot regions is less than 5%, the number of the plant seeds which can germinate and grow through the composite nonwoven fabric is too small. Also, if the total area is more than 60%, the resultant composite nonwoven fabric exhibits too low a mechanical strength and is easily broken.

The area of the individual pulp fiber-free spot regions is determined by the following method.

Five or more different portions of a composite nonwoven fabric each having 5 or more pulp fiber-free spot regions are photographed at the paper sheet layer side at a magnification of 4.0, and areas of 50 or more pulp fiber-free spot regions appearing in the photographs are measured by using an image analyser, and results are averaged. The area of the pulp fiber-free spot regions is indicated by the average.

The total area of the pulp fiber-free spot regions is determined by the following method.

In each of the above-mentioned photographs, the total area of the pulp fiber-free spot regions appearing within an area of 225 $mm^2$ is measured by using the image analyser. The total areas measured on the plurality of photographs are averaged.

A ratio in % of the average total area in $mm^2$ to 225 $mm^2$ is determined. The total area of the pulp fiber-free spot regions is indicated by the above-mentioned ratio in %.

In the bio-degradable composite nonwoven fabric of the present invention, the pulp fiber-free spot regions are arranged regularly or at random, preferably regularly. When the pulp fiber-free spot regions are arranged regularly, intervals between the spot regions and another spot regions located closest to the spot regions are preferably 1.0 to 11.0 mm, more preferably 1.3 to 8.7 mm, both in the longitudinal and transverse directions of the composite nonwoven fabric.

There is no limitation on the arrangement pattern of the pulp fiber-free spot regions. For example, the pulp fiber-free spot regions may be arranged in a checker pattern or in zigzag pattern both in the longitudinal and transverse directions of the composite nonwoven fabric.

The bio-degradable composite nonwoven fabric of the present invention can be produced by providing a bio-degradable polyester filament nonwoven fabric from a plurality of continuous filaments comprising the bio-degradable aliphatic polyester mentioned above; forming a laminate comprising (A) the bio-degradable polyester filament nonwoven fabric superimposed on a support having a plurality of supporting protuberances regularly spaced from each other, and (B) the paper sheet superimposed on the bio-degradable polyester filament nonwoven fabric; and directing a plurality of water jet streams through nozzle openings toward the paper sheet surface of the laminate under a pressure sufficient to locally press the laminate against the supporting protuberances which do not allow the water jet streams to permeate therethrough, to penetrate the laminate and thereby to three-dimensionally entangle the pulp fibers and the bio-degradable polyester filaments in the laminate with each other so as to convert the laminate to a composite nonwoven fabric.

In the above-mentioned process of the present invention, the pressure applied to the water jet streams is also sufficient to ensure that the pulp fibers distributed in the portions of the pressed laminate located on and around the supporting protuberances are forced to move to the circumferences of the pressed portions of the laminate, and the bio-degradable polyester filaments distributed in the pressed portions of the laminate are also forced to move toward the circumferences of the pressed laminate portions, whereby a plurality of spot regions which are spaced from each other and substantially free from the pulp fibers, and have a decreased distribution density of the bio-degradable polyester filaments, are regularly formed in the resultant composite nonwoven fabric.

Preferably, the water jet streams are directed through small holes having a diameter of 0.05 to 0.3 mm, more preferably 0.05 to 0.2 mm, under a pressure of 20 to 200 kg/cm$^2$, more preferably 30 to 150 kg/cm$^2$.

In the process of the present invention, the laminate comprising the bio-degradable polyester filament nonwoven fabric and a paper sheet superimposed on the nonwoven fabric is superimposed on a support so that the lower surface of the nonwoven fabric is brought into contact with the upper surface of the support.

The support is provided a plurality of supporting protuberances spaced from each other so as to support the laminate at the top faces of the supporting protuberances which do not allow the water jet streams to permeate therethrough.

When a plurality of water jet streams are spouted toward the paper sheet surface of the laminate supported by the top faces of the protuberances of the support, the pressure of the water jet streams is controlled to such an extent that the water jet streams press portions of the laminate supported by the top faces of the protuberances of the support, to the top faces of the protuberances, and penetrate the laminate so as to cause the pulp fibers and the continuous filaments to be entangled with each other and the laminate to be converted to a composite nonwoven fabric. Also, the pressure of the water jet streams must be controlled to a level sufficient to form a plurality of spot regions spaced from each other, substantially free from the pulp fibers and having a specific distribution density of the continuous filaments as defined above of 30 to 50%, in the resultant composite nonwoven fabric.

The mechanism of forming the pulp fiber-free spot regions is as follows.

Portions of the spouted water jet streams penetrate into portions of the laminate pressed to the top portions of the supporting protuberances of the support. Since the supporting protuberances do not allow the water jet streams to permeate therethrough, the penetrated portions of the water jet streams are spread in the pressed portions of laminate located on or about the top portions of the supporting protuberances toward the circumferences of the laminate portions. The spreading water jet streams force the pulp fibers distributed in the pressed portions of the laminate to move to the circumferences of the pressed portions of the laminate, and the pulp fibers moved to the circumferences are entangled with the continuous filaments with aid of the water streams passing through the laminate. Further, the spreading water jet streams force the continuous filaments distributed in the pressed portion of the laminate located on or about the top portions of the supporting protuberances toward the circumferences of the pressed portions so as to decrease the distribution density of the continuous filaments located in the pressed portions of the laminate. The portions of the continuous filaments moved to the circumferences of the pressed portions are also entangled with the pulp fibers in the portions.

Accordingly, the pressed portions of the laminate located on and about the top faces of the supporting protuberances are converted to spot regions, spaced from each other, substantially free from the pulp fibers and having a decreased distribution density of the continuous filaments.

In the process of the present invention, the water jet streams are preferably directed with a specific energy of 0.15 to 1.10 kWh/kg, more preferably 0.20 to 0.80 kWh/kg. The specific energy is defined by the following equation, $$E = \frac{A \times (2/\rho)^{1/2} \times (g \times P)^{3/2}}{(M_0 + M_1) \times 60 \times S \times L}$$

wherein E represents a specific energy (kWh/kg), A represents a total area (m$^2$) of the nozzle openings for directing water jet streams therethrough, $\rho$ represents a density of water (kg/m$^3$), g represents the acceleration of gravity (m/sec$^2$), P represents the pressure (Pa) of the water jet streams in the nozzle openings, $M_0$ represents a basis weight (g/m$^2$) of the paper sheet, $M_1$ represents a basis weight (g/m$^2$) of the bio-degradable polyester filament nonwoven fabric, S represents a speed (m/min) of treatment for the laminate, and L represents a width (m) of the water jet stream-treated portion of the laminate.

If the specific energy is less than 0.20 kWh/kg, the entanglement of the pulp fibers and the continuous filaments with each other and the formation of the pulp fiber-free regions in the composite nonwoven fabric may be unsatisfactory. Also, if the specific energy is more than 0.80 kWh/kg, the pulp fibers are undesirably scattered by the water jet streams and thus the resultant composite nonwoven fabric has a reduced content of pulp fibers.

An embodiment of the support having a plurality of supporting protuberances and usable for the process of the present invention is a coarse weave comprising a plurality of warps and wefts intersecting each other and having a plurality of throughholes defined by the warps and wefts. In this embodiment, the supporting protuberances are formed by the intersecting portions of the warps and wefts.

Figure 2A:
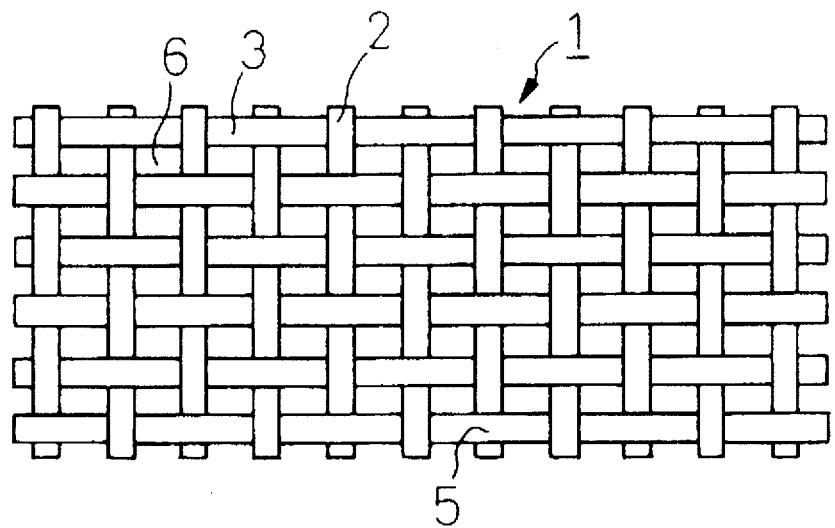
FIG. 2A is an explanatory plain view of a metal wire coarse weave usable as an embodiment of a support for the process of the present invention.
Figure 2B:
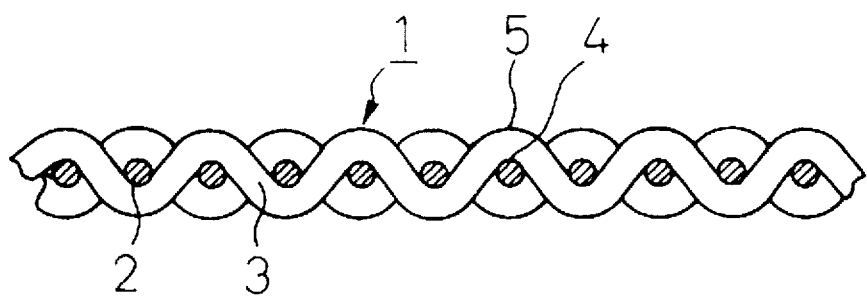
FIG. 2B is an explanatory cross sectional view of the metal wire coarse weave of FIG. 2A.

Referring to FIGS. 2A and 2B, a coarse weave 1 consists of a plurality of warps 2 and a plurality of wefts 3 intersecting each other. The intersecting portions 4 of the warps 2 and the wefts 3 form protuberances 5. Also, a plurality of throughholes 6 are defined by the warps 2 and the wefts 3.

The warps and wefts are formed from metal wires, for example, stainless steel wires and bronze wires, and synthetic polymer monofilaments, for example, polyester monofilaments or nylon monofilaments. There is no limitation to the weave structure of the coarse weave. Usually, the coarse weave is selected from plain weaves, twill weaves, satin weaves and double layer weaves. The coarse weave preferably has warp density of 1.8 to 10, preferably 2.3 to 8, warps/cm and a weft density of 1.8 to 10, preferably 2.3 to 8, wefts/cm. The warps and wefts preferably have a thickness of 0.5 to 2 mm, more preferably 0.7 to 2 mm.

Another embodiment of the support having a plurality of supporting protuberances comprises a base member and a plurality of protuberances projecting outward from the base member and spaced from each other.

Figure 3:
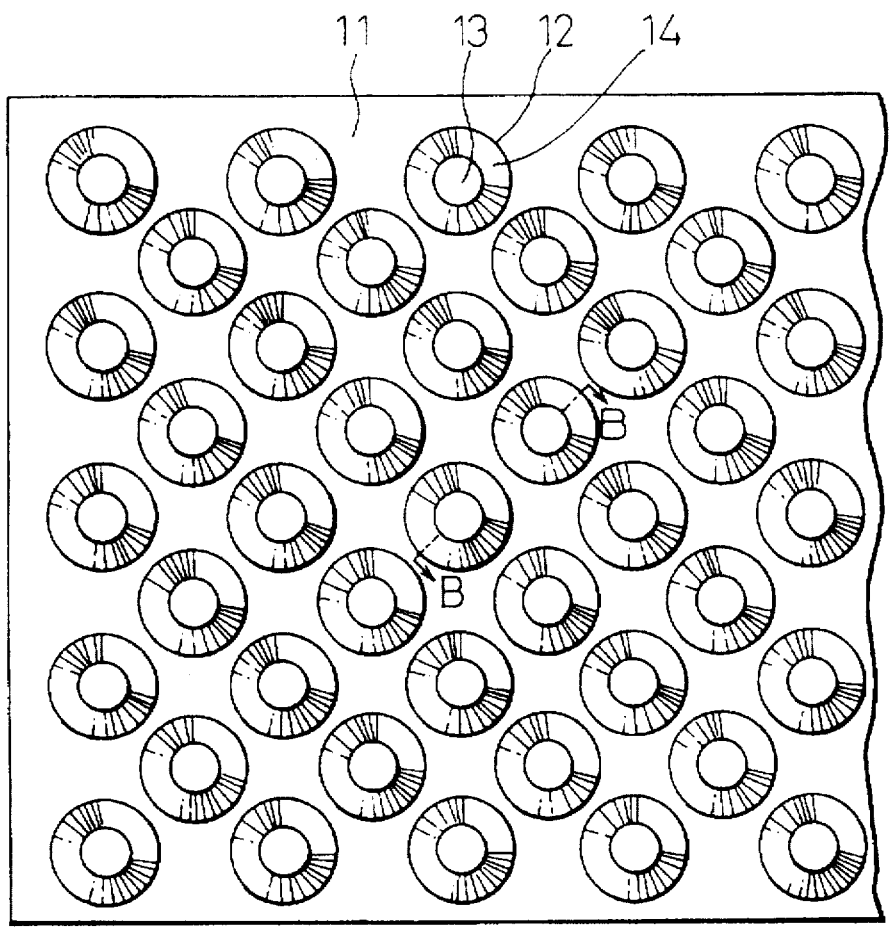
FIG. 3 is an explanatory plain view of another embodiment of a support usable for the process of the present invention.
Figure 4:
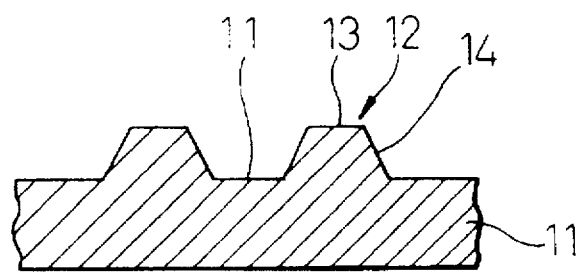
FIG. 4 is an explanatory cross-sectional view of a portion of the support along the line B—B in FIG. 3.

Referring to FIG. 3, from a base member 11, a plurality of protuberances 12 are projected outward. A cross-sectional profile of the protuberances 12 along the line B—B in FIG. 3 is shown in FIG. 4. In FIG. 4, a plurality of protuberances 12 are projected from a base member 11. Referring to FIGS. 3 and 4, each protuberance 12 has a top face 13 and an inclined periphery 14 connected to the surface of the base member 11.

The protuberances 12 may be regularly arranged as shown in FIG. 3, or arranged at random. Namely, the protuberances 12 may be arranged in a checker pattern or in zigzag pattern both in the longitudinal and transverse directions of the base member, as shown in FIG. 3. The protuberances 12 are spaced from the closest ones thereto at regular intervals (from center to center of the top faces of protuberances) of 1.0 to 5.6 mm, more preferably 1.3 to 4.4 mm. The top faces of the protuberances have an area of 0.16 to 16 mm$^2$, preferably 0.5 to 10 mm$^2$, and the heights of the protuberances are preferably 0.4 to 2.5 mm, more preferably 0.5 to 2.0 mm.

The form, height and arrangement of the protuberances are designed so that the water flow passing through the resultant composite nonwoven fabric superimposed on the protuberances can smoothly flow out from the support, without residing on the support.

The top face of the protuberances may be in a form of a circle, oval, square, rectangle, etc.

The base member optionally has a plurality of throughholes for discharging water passed through the resultant composite nonwoven fabric.

The base member may be in the form a plain plate, drum or endless conveyer. The total area of the top faces of the protuberances corresponds to 5 to 60%, preferably 10 to 50%, of the total surface area of the base member.

The resultant water jet stream-treated composite nonwoven fabric is dried by a dryer.

The composite nonwoven fabric is optionally coated with a water-insoluble synthetic polymeric material, to enhance the mechanical strength and water resistance thereof. The synthetic polymeric material preferably comprises at least one member selected from polyacrylic acid esters, polymethacrylic acid esters, ethylene-vinyl acetate copolymers, styrene-butadiene copolymers, acrylonitrile-butadiene copolymers, polyesters, polyurethanes and epoxy resins. These polymeric materials may be employed alone or in a mixture of two or more thereof.

When the polymeric material per se is cross-linkable, the resulting coating exhibits an enhanced water resistance and thus is advantageous in practice. The polymeric material may be employed together with an additive, for example, a cross-linking agent or a catalyst. The polymeric material is usually employed in the state of an aqueous emulsion or a solution in a solvent. The resultant coating from the polymeric material is preferably in an amount of 17% by weight or less, more preferably 1 to 15% by weight, based on the absolute dry weight of the composite nonwoven fabric. If the amount of the polymeric material coating is more than 17% by weight, the resultant coated composite nonwoven fabric may exhibit too high a stiffness.

The application of the polymeric material can be carried out by any conventional coating method. For example, the coating is carried out by an immersion method, size-pressing method, spraying method, roll coater coating method, comma coater coating method, mayer bar coating method, slit die-coater coating method, gravure printing method or rotary screen printing method.

The composite nonwoven fabric of the present invention exhibits excellent mechanical strengths both in wet and dry conditions, satisfactory flexibility and processability, and is thus useful as a plant cultivation sheet for preventing washing and blowing away of plant seeds and soil. The plant cultivation sheet made from the composite nonwoven fabric of the present invention allows the plant seeds to germinate and the shoots or roots of the plants to grow through the sheet, and can be completely degraded by micro-organisms in a compost, in wet soil, in water containing active sludge or sea water, and thus is free from waste treatment problems.

EXAMPLES

The present invention will be further explained by the following examples which are merely representative and do not limit the scope of the present invention in any way.

Example 1

A bio-degradable filament nonwoven fabric was prepared by the following procedures.

An aliphatic polyester resin prepared from ethylene glycol and an aliphatic dicarboxylic acid derivative, having a bio-degradation property and available under the trademark of BIONOLLE, from Showa Kobunshi K.K. was provided. This aliphatic polyester resin had a melting temperature of 114° C. and a melt flow rate of 30 g/10 minutes at a temperature of 190° C. Before employment, the resin was dry-treated in a dryer. The dried resin had a moisture content of 0.02%.

The aliphatic polyester resin was melted at a temperature of 220° C. and extruded through a plurality of melt spinning orifices; the extruded filamentary resin streams were drawn by using a high speed air blast to produce a plurality of drawn filaments; the resultant filaments were accumulated on a moving wire net to form a nonwoven web. The drawn filaments had a thickness of 2.4 deniers.

The filament nonwoven web was emboss-treated between a heat-embossing roll heated at a temperature of 100° C. and a smooth roll to form a polyester filament nonwoven fabric provided with a plurality of filament-bonded regions and having a basis weight of 20 g/m$^2$. In the embossing procedure, the embossing pressure per cm of the embossing roll length was 40 kg/cm, the resultant individual filament-bonded regions had an area of 0.12 mm$^2$ and the total area of the filament-bonded regions corresponded to 4.6% of the total surface area of the resultant polyester filament nonwoven fabric.

A paper sheet was prepared by the following procedures.

A soft wood bleached kraft pulp was employed to produce a dry paper sheet having a basis weight of 30 g/m$^2$. The dry paper sheet had a density of 0.51 g/cm$^3$ and a wet tensile strength of 0.08 kgf/25 mm.

The polyester filament nonwoven fabric was placed on a support consisting of a coarse plain weave, and the paper sheet was laminated on the polyester filament nonwoven fabric. The coarse plain weave consisted of polyethylene terephthalate monofilaments having a thickness of 0.75 mm and had warp and weft densities of 6 yarns/cm.

While moving the support supporting the laminate at a speed of 30 m/min, a plurality of water jet streams were directed through a plurality of water jet nozzles under a pressure of 60 kg/cm² (5.9 Pa) toward the paper sheet surface of the laminate.

The water jet nozzles have an opening diameter of 0.15 mm, and were arranged in three rows extending at intervals of 1 mm in direction crossing the moving direction of the support. The total area of the nozzle openings was 26.6 mm². The width of the portion of the laminate treated by the water jet streams was 0.5 m. The specific energy of the water jet streams was 0.38 kWh/kg.

The resultant composite nonwoven fabric was dried in a hot air dryer.

The composite nonwoven fabric had a plurality of spot regions arranged at intervals of about 1.7 mm, were substantially free from the pulp fibers, and had a surface area of about 0.4 mm². The total area of the pulp fiber-free spot regions corresponded to 20% of the total surface area of the composite nonwoven fabric. The distribution density of the polyester filaments in the pulp fiber-free spot regions was 48.5% based on the total surface area of the spot regions.

The resultant composite nonwoven fabric was subjected to the following tests.

(1) Bio-degradation test

Specimens were embedded in the earth at a depth of 25 cm at Koto-ku, Tokyo, Japan for 6 months, and thereafter, the degradation of the specimens was observed and evaluated by naked eye, as follows.
No degradation: No degradation was recognized on the filament nonwoven fabric
Degraded: Filament nonwoven fabric was degraded When the specimens consisted of a viscose rayon cut fiber nonwoven fabric, the test and evaluation were made on this nonwoven fabric.

(2) Measurement of individual pulp fiber-free spot region areas

The paper sheet layer side surface of the nonwoven fabric was photographed at at least five portions thereof including a plurality of pulp fiber-free spot regions. The photographs were subjected to image analysis at a magnification of 4.0, to measure the areas of at least 50 pulp fiber-free spot regions. An average of the measured areas was calculated. The area of the individual spot regions is indicated by the average area.

(3) Total area of the pulp fiber-free spot regions

The above-mentioned photographs were subjected to an image analyser to measure a total area of the pulp fiber-free spot regions distributed in 225 mm² of the surface area of the nonwoven fabric. The total areas measured from the photographs were averaged.

A proportion of the average total area of the spot regions to 225 mm² was calculated and indicated in percentage.

(4) Soil-washing away preventing property

A bag is formed in a length of 20 cm and width of 25 cm from a nonwoven fabric and charged with 140 g of soil. Then the opening of the bag was closed with a thread. The bag was placed on a polyvinyl chloride sheet and water was sprinkled on the bag at a flow rate of 1.0 liter/minutes for 60 minutes.

The washing away of the soil through the bag was observed by naked eye and evaluated as follows.

| Class | Evaluation |
|---|---|
| 5 | Substantially no soil was washed away. (Soil weight reduction = substantially zero) |
| 4 | Very small amount of soil was washed away. (Soil weight reduction = less than 10%) |
| 3 | Small amount of soil was washed away. (Soil weight reduction = 10% or more but less than 30%) |
| 2 | Large amount of soil was washed away. (Soil weight reduction = 30% or more but less than 50%) |
| 1 | Very large amount of soil was washed away. (Soil weight reduction = 50% or more). |

(5) Growth of shoots

Seeds of Perennial Lye-grass were cultured in the ground and covered by a cultivation sheet consisting of a nonwoven fabric and having dimensions of 200 mm×250 mm. The seeds were in the number of 1000 seeds per m². The cultivation was made at room temperature under natural light. The penetration of shoots through the sheet was observed by naked eye and evaluated by the percentage of the seeds which could germinate and grow through the cultivation sheet, based on the number of the seeds which were cultured by using no cultivation sheet and could germinate and grow.

The cultivation test results were evaluated as follows.

| Class | Evaluation |
|---|---|
| 5 | 80% to 100% |
| 4 | 60% or more but less than 80% |
| 3 | 40% or more but less than 60% |
| 2 | 20% or more but less than 40% |
| 1 | Less than 20% |

(6) Tensile strength (dry)

The dry tensile strength of the nonwoven fabric was measured by using a specimen with a width of 15 mm in accordance with JIS P 8113.

(7) Wet tensile strength

The wet tensile strength of the nonwoven fabric was measured by using a specimen with a width of 25 mm in accordance with JIS P 8135.

(8) Flexibility

The flexibility of the nonwoven fabric was evaluated by hand feeling as follows

| Class | Evaluation |
|---|---|
| 3 | Excellent |
| 2 | Satisfactory |
| 1 | Bad (Too stiff) |

The test results are shown in Table 1.

Example 2

A bio-degradable filament nonwoven fabric was prepared by the following procedures.

An aliphatic polyester resin prepared from ethylene glycol and an aliphatic dicarboxylic acid derivative, having a bio-degradation property and available under the trademark of BIONOLLE, from Showa Kobunshi K.K. was provided.

This aliphatic polyester resin had a melting temperature of 114° C. and a melt flow rate of 30 g/10 minutes at a temperature of 190° C. Before use, the resin was dry-treated in a dryer. The dried resin had a moisture content of 0.05%.

The aliphatic polyester resin was melted at a temperature of 200° C. and extruded through a plurality of melt spinning orifices; the extruded filamentary resin streams were drawn by using a high speed air blast to produce a plurality of drawn filaments; the resultant filaments were accumulated on a moving wire net to form a nonwoven web. The drawn filaments had a thickness of 2.8 deniers.

The filament nonwoven web was emboss-treated between a heat-embossing roll heated at a temperature of 100° C. and a smooth roll to form a polyester filament nonwoven fabric provided with a plurality of filament-bonded regions and having a basis weight of 15 g/m². In the embossing procedure, the embossing linear pressure was 40 kg/cm, the resultant individual filament-bonded regions had an area of 0.28 mm² and the total area of the filament-bonded regions corresponded to 6% of the total surface area of the resultant polyester filament nonwoven fabric.

A paper sheet was prepared by the following procedures.

A soft wood bleached kraft pulp was employed to produce a dry paper sheet having a basis weight of 100 g/m². The paper sheet had a density of 0.58 g/cm³ and a wet tensile strength of 0.68 kgf/25 mm.

The polyester filament nonwoven fabric was placed on a support consisting of a coarse plain weave, and the paper sheet was laminated on the polyester filament nonwoven fabric. The coarse plain weave consisted of polyethylene terephthalate monofilaments having a thickness of 1.2 mm and had warp and weft densities of 4 yarns/cm.

While moving the support supporting the laminate at a speed of 30 m/min, a plurality of water jet streams were directed through a plurality of water jet nozzles under a pressure of 100 kg/cm² (9.8 MPa) toward the paper sheet surface of the laminate.

The water jet nozzles had an opening diameter of 0.15 mm, and were arranged in three rows extending at intervals of 1 mm in the direction crossing the moving direction of the support. The total area of the nozzle openings was 26.6 mm². The width of the portion of the laminate treated by the water jet streams was 0.5 m. The specific energy of the water jet streams was 0.35 kWh/kg.

The resultant composite nonwoven fabric was dried in a hot air dryer.

The composite nonwoven fabric had a plurality of spot regions arranged at intervals of about 2.5 mm, substantially free from the pulp fibers and had a surface area of about 4 mm². The total area of the pulp fiber-free spot regions corresponded to 38% of the total surface area of the composite nonwoven fabric. The pulp fiber-free spot regions had a distribution density of the polyester filaments of 46.3% based on the total surface area of the spot regions.

The resultant composite nonwoven fabric was subjected to the same tests as in Example 1.

The test results are shown in Table 1.

Example 3

A bio-degradable filament nonwoven fabric was prepared by the following procedures.

An aliphatic polyester resin prepared from ethylene glycol and an aliphatic dicarboxylic acid derivative, having a bio-degradation property and available under the trademark of BIONOLLE, from Showa Kobunshi K.K. was provided.

This aliphatic polyester resin had a melting temperature of 95° C. and a melt flow rate of 30 g/10 minutes at a temperature of 190° C. Before use, the resin was dry-treated in a dryer. The dried resin had a moisture content of 0.06%.

The aliphatic polyester resin was melted at a temperature of 180° C. and extruded through a plurality of melt spinning orifices; the extruded filamentary resin streams were drawn by using a high speed air blast to produce a plurality of drawn filaments; the resultant filaments were accumulated on a moving wire net to form a nonwoven web. The drawn filaments had a thickness of 4.4 deniers.

The filament nonwoven web was emboss-treated between a heat-embossing roll heated at a temperature of 80° C. and a smooth roll to form a polyester filament nonwoven fabric provided with a plurality of filament-bonded regions and having a basis weight of 16 g/m². In the embossing procedure, the embossing linear pressure was 60 kg/cm, the resultant individual filament-bonded regions had an area of 2.0 mm² and the total area of the filament-bonded regions corresponded to 10% of the total surface area of the resultant polyester filament nonwoven fabric.

A paper sheet was prepared by the following procedures.

A soft wood bleached kraft pulp was employed to produce a dry paper sheet having a basis weight of 40 g/m². The paper sheet had a density of 0.49 g/cm³ and a wet tensile strength of 0.08 kgf/25 mm.

The polyester filament nonwoven fabric was placed on a support consisting of a coarse plain weave, and the paper sheet was laminated on the polyester filament nonwoven fabric. The coarse plain weave consisted of polyethylene terephthalate monofilaments having a thickness of 0.9 mm and had warp and weft densities of 5 yarns/cm.

While moving the support supporting the laminate at a speed of 30 m/min, a plurality of water jet streams were directed through a plurality of water jet nozzles under a pressure of 50 kg/cm² (4.9 MPa) toward the paper sheet surface of the laminate.

The water jet nozzles had an opening diameter of 0.15 mm, and were arranged in three rows extending at intervals of 1 mm in direction crossing the moving direction of the support. The total area of the nozzle openings was 26.6 mm². The width of the portion of the laminate treated by the water jet streams was 0.5 m. The specific energy of the water jet streams was 0.26 kWh/kg.

The resultant composite nonwoven fabric was dried in a hot air dryer.

The composite nonwoven fabric had a plurality of spot regions arranged at intervals of about 2.0 mm, substantially free from the pulp fibers and had a surface area of about 1.0 mm². The total area of the pulp fiber-free spot regions corresponded to 25% of the total surface area of the composite nonwoven fabric. Also, the pulp fiber-free spot regions had a distribution density of the polyester filaments of 43.2% based on the total surface area of the spot regions.

The resultant composite nonwoven fabric was subjected to the same tests as in Example 1.

The test results are shown in Table 1.

Example 4

A bio-degradable filament nonwoven fabric was prepared by the following procedures.

An aliphatic polyester resin prepared from ethylene glycol and an aliphatic dicarboxylic acid derivative, having a bio-degradation property and available under the trademark of BIONOLLE, from Showa Kobunshi K.K. was provided.

This aliphatic polyester resin had a melting temperature of 114° C. and a melt flow rate of 30 g/10 minutes at a temperature of 190° C. Before use, the resin was dry-treated in a dryer. The dried resin had a moisture content of 0.01%.

The aliphatic polyester resin was melted at a temperature of 190° C. and extruded through a plurality of melt spinning orifices; the extruded filamentary resin streams were drawn by using a high speed air blast to produce a plurality of drawn filaments; the resultant filaments were accumulated on a moving wire net to form a nonwoven web. The drawn filaments had a thickness of 2.1 deniers.

The filament nonwoven web was emboss-treated between a heat-embossing roll heated at a temperature of 95° C. and a smooth roll to form a polyester filament nonwoven fabric provided with a plurality of filament-bonded regions and having a basis weight of 10 g/m². In the embossing procedure, the embossing linear pressure was 30 kg/cm, the resultant individual filament-bonded regions had an area of 0.28 mm² and the total area of the filament-bonded regions corresponded to 6% of the total surface area of the resultant polyester filament nonwoven fabric.

A paper sheet was prepared by the following procedures.

A soft wood bleached kraft pulp was employed to produce a dry paper sheet having a basis weight of 70 g/m². The paper sheet had a density of 0.54 g/cm³ and a wet tensile strength of 0.40 kgf/25 mm.

The polyester filament nonwoven fabric was placed on a support consisting of a coarse plain weave, and the paper sheet was laminated on the polyester filament nonwoven fabric. The coarse plain weave consisted of polyethylene terephthalate monofilaments having a thickness of 0.9 mm and had warp and weft densities of 4 yarns/cm.

While moving the support supporting the laminate at a speed of 30 m/min, a plurality of water jet streams were directed through a plurality of water jet nozzles under a pressure of 70 kg/cm² (6.9 MPa) toward the paper sheet surface of the laminate.

The water jet nozzles had an opening diameter of 0.15 mm, and were arranged in three rows extending at intervals of 1 mm in direction crossing the moving direction of the support. The total area of the nozzle openings was 26.6 mm². The width of the portion of the laminate treated by the water jet streams was 0.5 m. The specific energy of the water jet streams was 0.30 kWh/kg.

The resultant composite nonwoven fabric was dried in a hot air dryer.

The composite nonwoven fabric had a plurality of spot regions arranged at intervals of about 25 mm, substantially free from the pulp fibers and had a surface area of about 1.8 mm². The total area of the pulp fiber-free spot regions corresponded to 31% of the total surface area of the composite nonwoven fabric. Also, the pulp fiber-free spot regions had a distribution density of 42.1% based on the total surface area of the spot regions.

The resultant composite nonwoven fabric was subjected to the same tests as in Example 1. The test results are shown in Table 1.

Example 5

The same composite nonwoven fabric-producing procedures as in Example 4 were carried out. An aqueous emulsion of an ethylene-vinyl acetate copolymer available under the trademark of S-830, from Sumitomo Kagaku KK, was diluted with water to adjust the solid concentration of the emulsion to 4.2% by weight. The composite nonwoven fabric was immersed in the diluted aqueous emulsion, taken out from the emulsion, squeezed by a squeezing mangle, and dried. The ethylene-vinyl acetate copolymer-coated nonwoven fabric had a coating in an amount of 4 g/m².

The polymer-coated composite nonwoven fabric was subjected to the same tests as in Example 1. The text results are shown in Table 1.

Example 6

The same procedures as in Example 1 were carried out with the following exceptions.

The support consisted of a drum having a diameter of 30 cm and provided with a plurality of protuberances projecting outward from the peripheral surface of the drum, having a height of 0.6 mm and a circular top face with a diameter of 1.2 mm and arranged at regular smallest intervals of 3.88 mm in the pattern shown in FIG. 3. The total area of the top faces of the protuberances corresponded to 15% of the peripheral surface of the drum.

The resultant composite nonwoven fabric had a plurality of pulp fiber-free spot regions having an area of 1.2 mm², a total area corresponding to 16% of the surface area of the composite nonwoven fabric and a distribution density of the polyester filament of 47.5%.

The resultant composite nonwoven fabric was subjected to the same tests as in Example 1. The test results are shown in Table 1.

Comparative Example 1

The same procedures as in Example 1 were carried out except that the aliphatic polyester filament nonwoven fabric had a basis weight of 40 g/m², and the resultant pulp fiber-free spot regions had a surface area of 0.12 mm², a total area corresponding to 4.6% of the total area of the composite nonwoven fabric and a distribution density of the polyester filaments of 64.5%.

The resultant composite nonwoven fabric was subjected to the same tests as in Example 1. The test results are shown in Table 1.

Comparative Example 2

The same procedures as in Example 1 were carried out except that the support consisted of a plain weave made from stainless steel wires having a thickness of 0.35 mm and having warp and weft densities of 16 wires/cm, and the pulp fiber-free spot regions formed in the resultant composite nonwoven fabric had an area of less than 0.1 mm², a total area corresponding to less than 2% of the total area of the composite nonwoven fabric, and a distribution density of the polyester filaments of 48.3%.

The resultant composite nonwoven fabric was subjected to the same tests as in Example 1. The test results are shown in Table 1.

Comparative Example 3

The same procedures as in Example 4 were carried out with the following exceptions.

The support consisted of a plain weave made from plastic wires having a thickness of 0.7 mm and warp and weft densities of 4 wires/cm. The pulp fiber-free spot regions formed in the resultant composite nonwoven fabric had a surface area of 0.4 mm², a total area corresponding to 3.4% of the total area of the composite nonwoven fabric, and a distribution density of the polyester filaments of 43.4%.

The resultant composite nonwoven fabric was subjected to the same tests as in Example 1. The test results are shown in Table 1.

Comparative Example 4

The same procedures as in Example 1 were carried out with the following exceptions.

In the resultant composite nonwoven fabric, a plurality of circular throughholes having a diameter of 3 mm were formed by using a punch in a distribution density of 2 holes/cm$^2$.

In the resultant composite nonwoven fabric, the throughholes were free from the pulp fibers and the polyester filaments and had an area of 7 mm$^2$ and a total area corresponding to 21% of the surface area of the composite nonwoven fabric.

The resultant punched composite nonwoven fabric was subjected to the tests as in Example 1. The test results are shown in Table 1.

Comparative Example 5

The same procedures as in Example 4 were carried out with the following exceptions.

The test results are shown in Table 1.

Comparative Example 7

Viscose rayon fibers having a length of 50 mm and a thickness of 2 deniers were loosed by a carding machine and accumulated to form a web having a basis weight of 50 g/m$^2$. The viscose rayon fiber web was placed on the same support as in Example 2 and subjected to the same water jet stream treatment as in Example 2. The resultant nonwoven fabric had throughholes having an area of 3.8 mm$^2$ and total area corresponding to 32% of the surface area of the nonwoven fabric. The nonwoven fabric was subjected to the same tests as in Example 1. The tests results are shown in Table 1.

TABLE 1

| | | | Performances of nonwoven fabric | | | | | | |
| | | | Pulp fiber-free spot region | | | | | | |
| Example No. | Item | Bio-degrada-bility | Area (mm$^2$) | Proportion of total area (%) | Distribution density of filaments (%) | Prevention of soil-washing away (class) | Penetration of germs (class) | Tensile strength (kgf) Dry (15 mm width) | Wet (25 mm width) | Flexi-bility (class) |
|---|---|---|---|---|---|---|---|---|---|---|
| Example | 1 | Good | 0.4 | 20 | 48.5 | 5 | 5 | 2.3 | 1.9 | 3 |
|  | 2 | Good | 4.0 | 38 | 46.3 | 5 | 5 | 2.1 | 1.7 | 3 |
|  | 3 | Good | 1.0 | 25 | 43.2 | 5 | 5 | 1.8 | 1.6 | 3 |
|  | 4 | Good | 1.8 | 31 | 42.1 | 5 | 5 | 1.6 | 1.3 | 3 |
|  | 5 | Good | 1.8 | 31 | 42.3 | 5 | 5 | 2.0 | 2.0 | 3 |
|  | 6 | Good | 1.2 | 16 | 47.5 | 5 | 5 | 2.2 | 1.9 | 3 |
| Compar- | 1 | Good | 0.3 | 16 | 64.5 | 5 | 1 | 5.0 | 4.8 | 3 |
| ative | 2 | Good | <0.1 | <2 | 48.3 | 5 | 2 | 2.3 | 2.1 | 3 |
| Example | 3 | Good | 0.4 | 3.4 | 43.4 | 5 | 2 | 1.6 | 1.2 | 3 |
|  | 4 | Good | 7.0 | 21 | 0 | 2 | 4 | 1.8 | 1.7 | 3 |
|  | 5 | Poor | 1.8 | 31 | 45.9 | 5 | 5 | 1.8 | 1.6 | 3 |
|  | 6 | Good | (*)$_1$ | (*)$_1$ | 60.5 | 2 | 5 | 1.9 | 1.9 | 3 |
|  | 7 | Good | 3.8 | 32 | 12.6 | 2 | 4 | 1.9 | 0.5 | 3 |

Note: (*)$_1$ ... Very large

The bio-degradable polyester filament nonwoven fabric was replaced by a polypropylene filament nonwoven fabric comprising a polypropylene resin having a melt flow rate of 40 g/10 minutes at a temperature of 230° C., the melt-spinning temperature of the polypropylene filaments were 220° C. and the embossing temperature was 130° C.

In the resultant composite nonwoven fabric, the pulp fiber-free spot regions had an area of 1.8 mm$^2$, a total area corresponding to 31% of the surface area of the composite nonwoven fabric, and a distribution density of the polypropylene filaments of 45.9%.

The resultant composite nonwoven fabric was subjected to the same tests as in Example 1. The test results are shown in Table 1.

Comparative Example 6

The same bio-degradable polyester filament nonwoven fabric as in Example 1 was subjected, as a plant cultivation sheet, to the same tests as in Example 1.

Table 1 clearly shows that the composite nonwoven fabrics of Examples 1 to 6 in accordance with the present invention have satisfactory mechanical strength, flexibility and bio-degradation property, and when used as a plant cultivation sheet, can protect plant seeds and soil covered thereby and prevent washing and blowing away of the seeds and soil by water flow and wind, and allow the seeds to germinate and the shoots to grow through the sheet.

Also, Example 5 shows that when coated with a water-resistant polymeric material, the resultant composite nonwoven fabric exhibited enhanced water resistance and wet tensile strength.

The composite nonwoven fabric of the present invention can easily follow the roughness of the ground surface and also can be sewn by sewing machine. Therefore, the composite nonwoven fabric can be formed into bags for containing soil and seeds.

The plant cultivation sheets consisted of the composite nonwoven fabrics of Comparative Examples 1 to 3 exhibited an unsatisfactory property for allowing the shoots to grow through the sheets. Also, the plant cultivation sheets consisted of the nonwoven fabrics of Comparative Examples 4, 6 and 7 had unsatisfactory properties for preventing the washing and blowing away of the seeds and soil. The composite nonwoven fabric of Comparative Example 5 had a poor bio-degradation property. Also, the nonwoven fabric of Comparative Example 6 exhibited a poor prevention effect to soil-washing away, and the nonwoven fabric of Comparative Example 7 had a very low mechanical strength in wet conditions.

The bio-degradable composite nonwoven fabric having the above-mentioned excellent performances can be produced by the process of the present invention.

We claim:

1. A bio-degradable composite nonwoven fabric for plant cultivation, comprising
   (A) a biodegradable polyester filament nonwoven fabric layer consisting essentially of a plurality of continuous filaments comprising a bio-degradable polyester which is a polymerization product of a glycol component comprising at least one aliphatic dihydric alcohol with a dicarboxylic acid component comprising at least one member selected from the group consisting of aliphatic dicarboxylic acids and hydroxyl and acetoxyl derivatives of the above-mentioned dicarboxylic acids; and
   (B) a paper sheet layer laminated on the biodegradable polyester filament nonwoven fabric layer (A) and comprising wood pulp fibers, wherein
      (a) the continuous filaments and the wood pulp fibers are three-dimensionally entangled with each other to form a composite nonwoven fabric, and
      (b) a plurality of spot regions which are spaced from each other, are substantially free from the pulp fibers, and have a distribution density of the continuous filaments of 30 to 50%, an area of 0.16 to 16 mm$^2$ and a total area corresponding to 5 to 60% of the total surface area of the composite nonwoven fabric, are provided in the composite nonwoven fabric, the distribution density of the continuous filaments being defined as a ratio of a total area of the continuous filaments visible within the pulp fiber-free spot region to the total surface area of the pulp fiber-free spot regions, determined from photographs of the spot regions.

2. The bio-degradable composite nonwoven fabric as claimed in claim 1, wherein the bio-degradable polyester filament nonwoven fabric is a spun bonded polyester filament nonwoven fabric having a basis weight of 5 to 30 g/m$^2$.

3. The bio-degradable composite nonwoven fabric as claimed in claim 1, wherein the aliphatic dihydric alcohol is selected from the group consisting of alkylene glycols having 2 to 12 carbon atoms and cycloalkylene glycols and cycloalkylene-dialkanols each having 5 to 12 carbon atoms.

4. The bio-degradable composite nonwoven fabric as claimed in claim 1, wherein the dicarboxylic acid component comprises at least one member selected from the group consisting of malonic acid, succinic acid, adipic acid, suberic acid, sebacic acid, dodecanoic diacid, tartaric acid, malic acid, tetrahydroxysuccinic acid, tartronic acid and acetoxysuccinic acid.

5. The bio-degradable composite nonwoven fabric as claimed in claim 1, wherein the bio-degradable polyester filament nonwoven fabric layer has a plurality of filament-bonded portions in which the filaments are locally press-bonded to each other at the intersection points thereof.

6. The bio-degradable composite nonwoven fabric as claimed in claim 5, wherein the filament-bonded portions of the bio-degradable polyester nonwoven fabric layer each have an area of 0.03 to 4 mm$^2$.

7. The bio-degradable composite nonwoven fabric as claimed in claim 5, wherein the filament-bonded portions of the bio-degradable polyester nonwoven fabric layer have a total area corresponding to 2 to 20% of to the total area of a surface of the composite nonwoven fabric.

8. The bio-degradable composite nonwoven fabric as claimed in claim 1, wherein the aliphatic polyester filaments have a thickness of 1 to 10 denier.

9. A process for producing the bio-degradable composite nonwoven fabric as claimed in claim 1, comprising the steps of:
   (1) forming a laminate comprising
      (A) a bio-degradable polyester filament nonwoven fabric consisting essentially of a plurality of continuous filaments comprising a bio-degradable aliphatic polyester which is a polymerization product of a glycol component comprising at least one aliphatic dihydric alcohol with a dicarboxylic acid component comprising at least one member selected from the group consisting of aliphatic dicarboxylic acids and hydroxyl and acetoxyl derivatives thereof, and superimposed on a support having a plurality of supporting protuberances spaced from each other, and
      (B) a paper sheet comprising wood pulp fibers and superimposed on the bio-degradable polyester filament nonwoven fabric; and
   (2) directing a plurality of water jet streams through nozzle openings toward the paper sheet surface of the laminate under a pressure sufficient to locally press the laminate against the supporting protuberances which do not allow the water jet streams to permeate therethrough, to penetrate the laminate and thereby to three-dimensionally entangle the pulp fibers and the continuous filaments with each other so as to convert the laminate to a composite nonwoven fabric, wherein the pressure applied to the water jet streams is also sufficient to force the pulp fibers distributed in portions of the pressed laminate located on and around the supporting protuberances to move to the circumferences of the pressed portions of the laminate, and the continuous filaments in the pressed laminate portions to move toward the circumferences of the pressed laminate portions, whereby a plurality of spot regions which are spaced from each other, are substantially free from the pulp fibers, and have a distribution density of the continuous filaments of 30 to 50%, an area of 0.16 to 16 mm$^2$ and a total area corresponding to 5 to 60% of the total surface area of the composite nonwoven fabric, are formed in the resultant composite nonwoven fabric, the distribution density of the continuous filaments being defined as a ratio of the total area of the polyester filaments visible within the pulp fiber-free spot region to the total surface area of the spot regions, determined from photographs of the spot regions.

10. The process as claimed in claim 9, wherein the water jet streams are spouted with a specific energy of 0.20 to 0.80 kWh/kg determined in accordance with the equation:

$$E = \frac{A \times (2/\rho)^{1/2} \times (g \times P)^{3/2}}{(M_0 + M_1) \times 60 \times S \times L}$$

wherein E represents a specific energy in the units of kWh/kg of the water jet streams, A represents a total area in the units of m² of the nozzle openings for spouting the water jet streams therethrough, p represents a density in the units of kg/m³ of water, g represents the acceleration of gravity in the units of m/sec², P represents a pressure in the units of Pa of the water jet streams in the nozzle openings, $M_0$ represents a basis weight in the units of g/m² of the paper sheet, $M_1$ represents a basis weight in the units of g/m² of the bio-degradable polyester filament nonwoven fabric, S represents a speed in the units of m/min of the treatment for the laminate, and L represents a width in the units of m of the water jet-stream-treated portion of the laminate.

11. The process as claimed in claim 9, wherein the bio-degradable polyester filament nonwoven fabric has a basis weight of 5 to 30 g/m².

12. The process as claimed in claim 9, wherein the continuous filaments for the bio-degradable polyester filament nonwoven fabric have a thickness of 1 to 10 deniers.

13. The process as claimed in claim 9, wherein the bio-degradable polyester filament nonwoven fabric has an average density of 0.10 to 0.15 g/cm³.

14. The process as claimed in claim 9, wherein the bio-degradable polyester filament nonwoven fabric has a plurality of filament-bonded portions in which the filaments are locally bonded to each other.

15. The process as claimed in claim 14, wherein each of the filament-bonded portions has an area of 0.03 to 4 mm².

16. The process as claimed in claim 14, wherein the filament-bonded portions have a total area corresponding to 2 to 20% of the total area of a surface of the composite nonwoven fabric.

17. The process as claimed in claim 11, wherein the filament-bonded portions are formed by embossing the bio-degradable polyester filament nonwoven fabric at a temperature of 5° to 50° C. below the melting temperature of the aliphatic polyester under a linear pressure of 10 to 80 kg/cm.

18. The process as claimed in claim 9, wherein the paper sheet has a basis weight of 10 to 150 g/m².

19. The process as claimed in claim 9, wherein the paper sheet has a density of 0.2 to 0.65 g/cm³.

20. The process as claimed in claim 9, wherein the paper sheet has a wet tensile strength of 0.04 to 15 kgf/25 mm.

21. The process as claimed in claim 9, wherein a ratio in basis weight of the paper sheet to the bio-degradable polyester nonwoven fabric is in the range of from 1:0.05 to 1:2.

22. The process as claimed in claim 9, wherein the support having a plurality of supporting protuberances is a coarse weave comprising a plurality of warps and wefts intersecting each other and having a plurality of throughholes defined by the warps and wefts, and the supporting protuberances are formed by the intersecting portions of the warps and wefts.

23. The process as claimed in claim 22, wherein the coarse weave has a warp density of 1.8 to 10 warps/cm and a weft density of 1.8 to 10 wefts/cm.

24. The process as claimed in claim 22, wherein the warps and wefts have a thickness of 0.5 to 2.0 mm.

25. The process as claimed in claim 9, wherein the support having a plurality of supporting protuberances comprises a base member and a plurality of protuberances projecting outward from the base member and having top faces spaced from each other.

26. The process as claimed in claim 25, wherein the base member is in the form of a drum and the protuberances are arranged on the peripheral surface of the drum.

27. The process as claimed in claim 25, wherein the base member is in the form of an endless conveyer and the protuberances are arranged on the peripheral surface of the endless conveyer.

28. The process as claimed in claim 25, wherein the protuberances have a height of 0.4 to 2.5 mm, and the top faces have an area of 0.16 to 16 mm².

29. The process as claimed in claim 25, wherein the protuberances are arranged at regular intervals of 1.0 to 5.6 mm.

* * * * *